(12) United States Patent
Yang et al.

(10) Patent No.: US 7,638,216 B2
(45) Date of Patent: Dec. 29, 2009

(54) FUEL CELL APPARATUS AND ASSOCIATED METHOD

(75) Inventors: Hai Yang, Shanghai (CN); Chang Wei, Niskayuna, NY (US); Qunjian Huang, Shanghai (CN); Jinghua Liu, Shanghai (CN); Rihua Xiong, Shanghai (CN); Jun Cai, Shanghai (CN); Shengxian Wang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 463 days.

(21) Appl. No.: 11/566,347

(22) Filed: Dec. 4, 2006

(65) Prior Publication Data

US 2007/0141415 A1  Jun. 21, 2007

Related U.S. Application Data

(63) Continuation-in-part of application No. 11/522,251, filed on Sep. 15, 2006, and a continuation-in-part of application No. 11/314,758, filed on Dec. 21, 2005, now abandoned, and a continuation-in-part of application No. 11/313,629, filed on Dec. 21, 2005.

(51) Int. Cl.
*H01M 2/00* (2006.01)
*H01M 4/00* (2006.01)

(52) U.S. Cl. .............................. 429/13; 429/27; 429/44

(58) Field of Classification Search .................. 429/27, 429/44, 22, 19, 13
See application file for complete search history.

(56) References Cited

U.S. PATENT DOCUMENTS

| 5,480,741 | A  | * | 1/1996  | Sakai et al. ................... 429/59 |
| 6,127,061 | A  | * | 10/2000 | Shun et al. .................... 429/40 |
| 6,500,575 | B1 |   | 12/2002 | Shiue et al. |
| 7,311,991 | B2 | * | 12/2007 | Huang et al. .................. 429/44 |

FOREIGN PATENT DOCUMENTS

JP            07282860         10/1995

* cited by examiner

*Primary Examiner*—Patrick Ryan
*Assistant Examiner*—Thomas H. Parsons
(74) *Attorney, Agent, or Firm*—Andrew J. Caruso

(57) ABSTRACT

An apparatus including a housing having walls is provided. The walls of the housing each have inner surfaces and outer surfaces. The walls may include apertures extending from the inner surface to the outer surface. The inner surfaces of the walls define a volume. The volume includes an electrode. The volume further includes a water-controlling separator disposed between the inner surface of the housing and the electrode. The water-controlling separator can block a flow of liquid from the electrode through the apertures to the ambient environment while allowing oxidant to flow from the ambient environment through the apertures to the electrode.

32 Claims, 2 Drawing Sheets

FUEL CELL APPARATUS AND ASSOCIATED METHOD

CROSS REFERENCE TO RELATED APPLICATIONS

Figure 1:
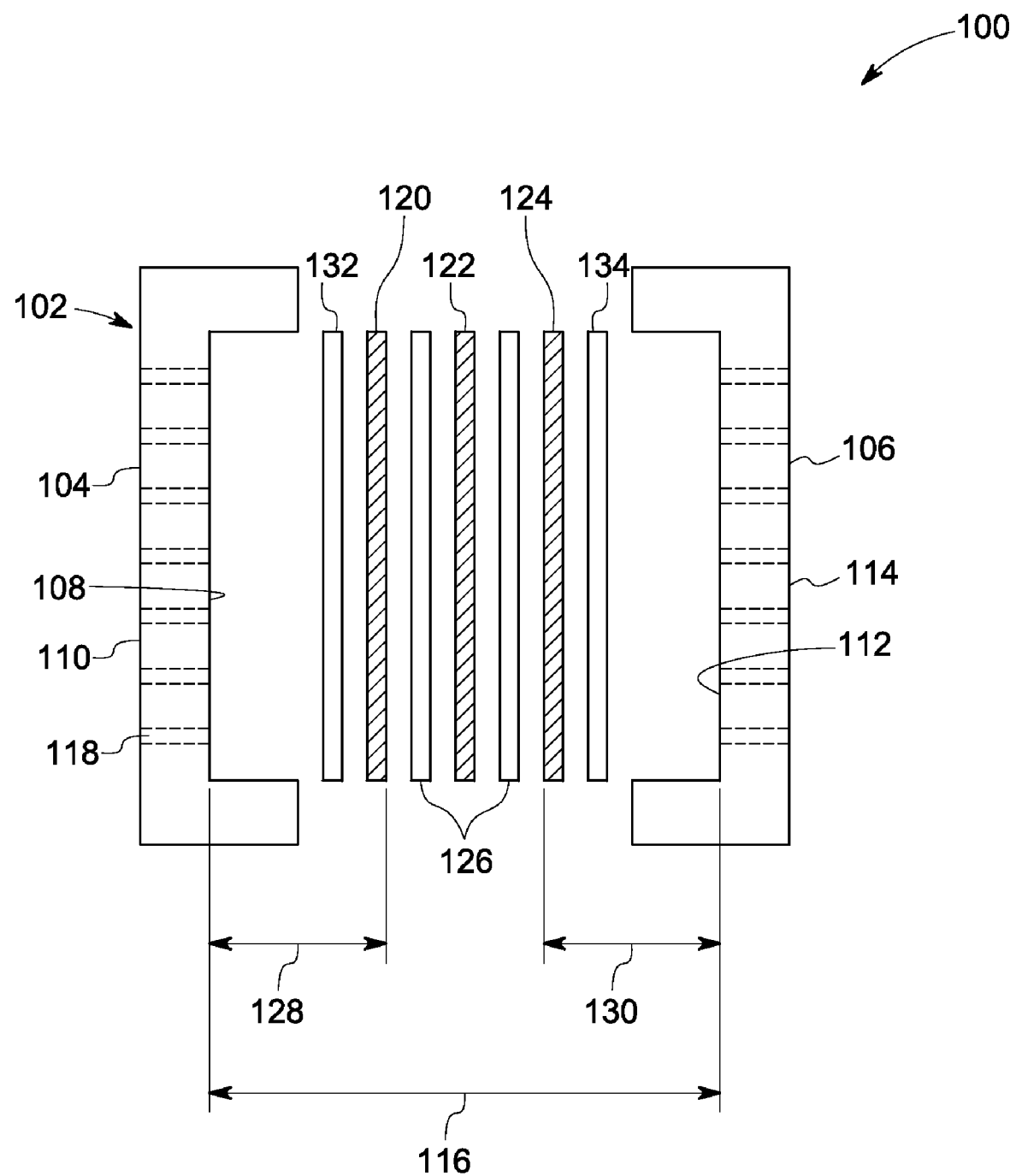

This application is a continuation-in-part of U.S. patent application Ser. No. 11/522,251; titled "HYDROGEN STORAGE COMPOSITION, AND ASSOCIATED ARTICLE AND METHOD" filed on Sep. 15, 2006; and is a continuation-in-part of U.S. patent application Ser. No. 11/314,758; titled "THIRD ELECTRODE FRAME STRUCTURE AND METHOD RELATED THERETO" filed on Dec. 21, 2005 (now abandoned); and is a continuation-in-part of U.S. patent application Ser. No. 11/313,629; "GAS SCRUBBER AND METHOD RELATED THERETO" filed on Dec. 21, 2005. The contents of which are incorporated by reference.

TECHNICAL FIELD

The invention includes embodiments that relate to an apparatus including a fuel cell. The invention includes embodiments that relate to a method of using the fuel cell.

DISCUSSION OF RELATED ART

An electrochemical cell may convert the chemical energy of a fuel directly into electricity without any intermediate thermal or mechanical processes. Energy may be released when a fuel reacts chemically with oxygen in the air. A fuel cell may convert hydrogen and oxygen into water. The conversion reaction occurs electrochemically and the energy may be released as a combination of electrical energy and heat. The electrical energy can do useful work directly, while the heat may be dispersed.

Fuel cell vehicles may operate on hydrogen stored onboard the vehicles and may produce little or no conventional undesirable by-products. Neither conventional pollutants nor green house gases may be emitted. The byproducts may include water and heat. Systems that rely on a reformer on board to convert a liquid fuel to hydrogen produce small amounts of emissions depending on the choice of fuel.

Other energy storage devices may include metal/air cell. Metal/air cells include a cathode that uses oxygen as an oxidant and a solid fuel anode. The metal/air cells differ from fuel cells in that the anode may be consumed during operation. Metal/air batteries may be anode-limited cells having a relatively high energy density.

A rechargeable fuel cell may be a kind of fuel cell using a hydrogen storage material as an anode and an air electrode as a cathode. The hydrogen storage material functions as both a hydrogen source for fuel and as a hydrogen oxidization catalyst. Water may be employed as an energy transformation media. When electricity is charged in the rechargeable fuel cell, water may be electrolyzed into hydrogen and oxygen. The produced hydrogen may be stored in the anode. In reverse when the electricity is exported to the loads, the hydrogen from the anode and oxygen from air constitute a fuel cell to deliver electricity. The energy stored in the rechargeable fuel cell depends on the capacity of the anode. This functionality may avoid the need for a high-pressure hydrogen container and allows for higher energy density.

As recyclable power sources, both rechargeable fuel cells and electrically rechargeable metal/air batteries may need to have a long service life. However in such a dual functional electrochemical system, where electrochemical system behaves as fuel cell in discharging process and as electrolysis cell in charging process, the air electrode may degrade quickly during charging process. The system efficiency may suffer by the compromise of the air electrode materials for both oxygen reduction and water oxidization. Further the cells of this type may include a third electrode used as cathode during charge process to reduce or prevent the degradation of air electrode. The cells may have limited specific power and energy efficiency for some applications, such as in the automotive industry. In addition conventional cells may suffer from water loss and oxygen evolution during charge process.

It may be desirable to have a fuel cell having differing characteristics or properties than those fuel cells that are currently available. It may be desirable to have a method of using a fuel cell having that differs from those methods that are currently available.

BRIEF DESCRIPTION

In accordance with an embodiment of the invention an apparatus is provided. The apparatus includes a housing having walls. The walls of the housing each have an inner surface and an outer surface. Each wall may include apertures extending from the inner surface to the outer surface. The inner surfaces of the walls define a volume. The volume includes an electrode. The volume further includes a water-controlling separator disposed between the inner surface of the housing and the electrode. The water-controlling separator can block a flow of liquid from the electrode through the apertures to the ambient environment while allowing oxidant to flow from the ambient environment through the apertures to the electrode.

An apparatus is provided in one embodiment. The apparatus includes a housing having walls. The walls of the housing each have an inner surface and an outer surface. Each wall may include apertures extending from the inner surface to the outer surface. The inner surfaces of the walls define a volume. The volume includes an electrode. The electrode is a supercapacitor electrode. The volume further includes a water-controlling separator disposed between the inner surface of the housing and the electrode. The water-controlling separator can block a flow of liquid from the electrode through the apertures to the ambient environment while allowing oxidant to flow from the ambient environment through the apertures to the electrode.

In one embodiment a method of using a fuel cell includes drawing discharge current or working voltage from an electrode is provided.

BRIEF DISCUSSION OF DRAWINGS

Figure 2:
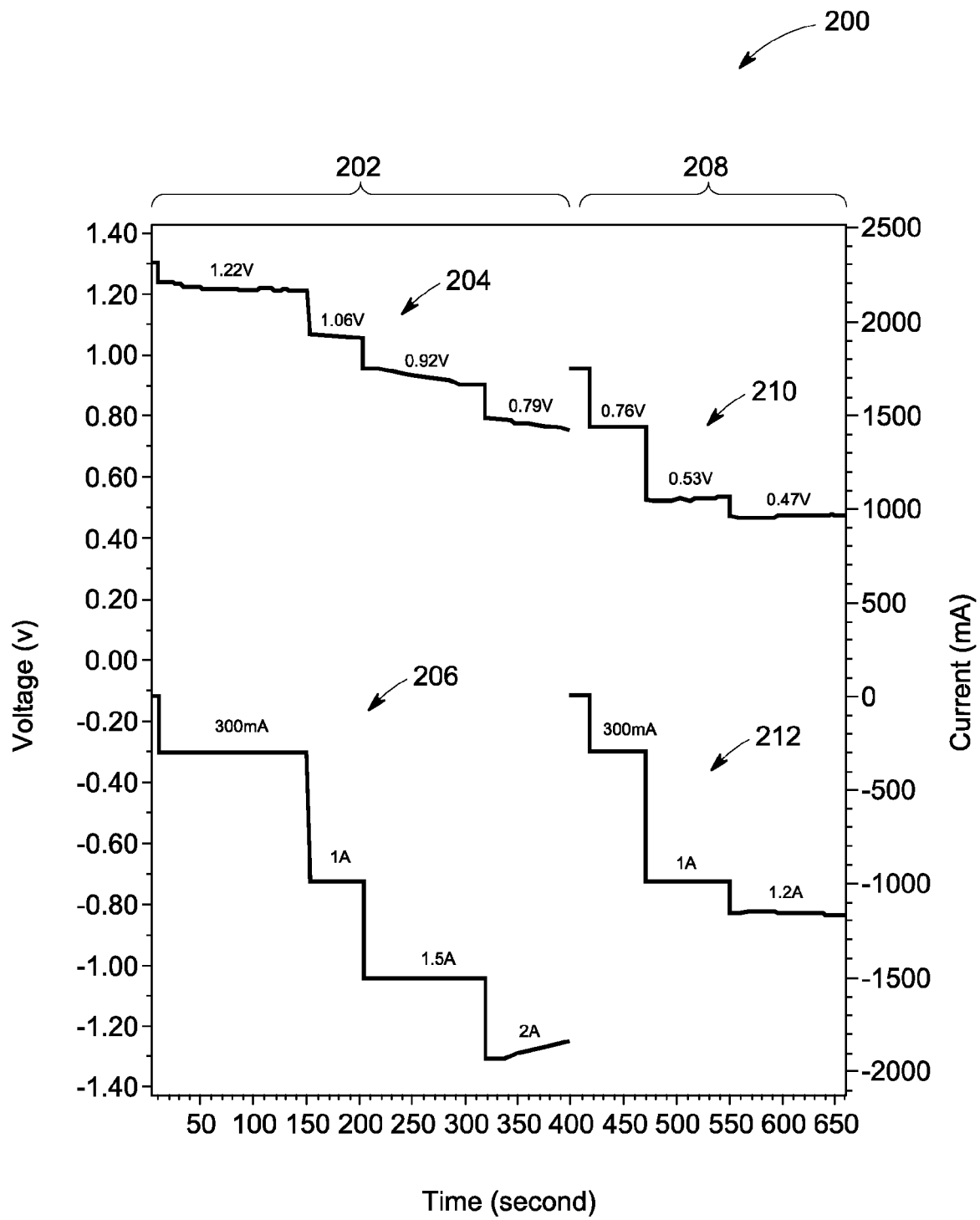

FIG. 1 is an exploded schematic side view of an apparatus according to one embodiment of the invention FIG. 2 is a chart of performance characteristics of the apparatus according to one embodiment of the invention.

DETAILED DESCRIPTION

The invention includes embodiments that relate to a fuel cell. The invention includes embodiments that relate to a method of using the fuel cell.

Approximating language as used herein throughout the specification and claims may be applied to modify any quantitative representation that could permissibly vary without resulting in a change in the basic function to which it may be about related. Accordingly, a value modified by a term such as "about" is not limited to the precise value specified. In some instances the approximating language may correspond to the precision of an instrument for measuring the value.

According to one embodiment an apparatus is provided. The apparatus includes a housing having one or more walls. The housing may be made of a metal, an alloy, a polymer or a refractory material. The housing wall can be of different shapes and sizes. In one embodiment, the housing may be polygonal in shape. As used herein, polygonal housing includes square or rectangular housing. In one embodiment, the housing may be cylindrical in shape. The moldable housing may provide structural support and electrical support.

In one embodiment, the housing wall has an inner surface and an outer surface. The inner and outer surfaces of the wall define the apertures that are capable of passing fluid therethrough. As used herein, apertures include holes, pores, mesh and the like. The shape and size of the apertures may be selected with reference to such factors as desired flow rate of the oxidant and end use application. The inner surface of the wall defines a volume.

The electrode is disposed in the volume, and the electrode may be one of a plurality of electrodes. In one embodiment, the plurality of electrodes may be configured as a plate. In one embodiment, the plurality of the electrodes may be configured as a cylinder. The plurality of electrodes includes a first electrode, a second electrode and a third electrode. The second electrode is in ionic communication with each of the first electrode and third electrode.

The first electrode may be an air electrode. The air electrode consumes oxygen from outside ambient air during discharge, and generates oxygen during charge operation of the fuel cell. The air electrode is made of carbon matrix and a catalyst. The catalyst is capable of accelerating dissociation of molecular oxygen into atomic oxygen. In other words, oxygen from air is reduced at the air electrode and, generated free electrons conduct through the external circuit. The catalyst may include metals or metal oxide selected from platinum, palladium, ruthenium, silver, manganese dioxide, nickel oxide, cobalt oxide, perovskite oxide, or a combination of two or more thereof.

The second electrode may be an anode. The anode or negative electrode may act as both a hydrogen oxidization catalyst or as a hydrogen storage media. The anode includes a hydrogen storage material capable of receiving, storing and releasing hydrogen. The anode embodiments may include an active material supported on a current collector grid. The active material for the anode may include a hydrogen storage material, a binder material, and graphite or graphitized carbon. Other suitable active materials may include metals such as nickel, and metal oxides such as nickel oxide. Suitable nickel metal may be the commercially available trademark RANEY nickel. Suitable hydrogen storage material may be selected from hydride complexes, aluminides, borides, carbides, germanides, and silicides, or a combination of two or more thereof.

Suitable hydride complexes may include a H-M complex, where M is a metal and H is hydrogen. Such hydrides may have ionic, covalent, metallic bonding or bonding including a combination of at least one of the foregoing types of bonding. These hydrides have a hydrogen to metal ratio of greater than or equal to 1. The reaction between a metal and hydrogen to form a hydride may be a reversible reaction and takes place according to the following equation (VI):

$$M+(x/2)H_2 \leftrightarrow MH_x \tag{VI}$$

Hydride complexes can store up to 18 weight percent (weight percent) of hydrogen, and have high volumetric storage densities. The volumetric storage density of hydrides may be greater than either liquid or solid hydrogen, which makes them very useful in energy storage applications. The process of hydrogen adsorption, absorption or chemisorption results in hydrogen storage and may be hereinafter referred to as absorption, while the process of desorption results in the release of hydrogen.

Suitable metal hydrides include but are not limited to Ni, Co, Al, Mn, Mo, Ti, Zn, Rh, Ru, Ir, La, Ni, Fe, Ti, Zr, W, V, B and alloys of these materials. The alloys may be selected from Rare-earth metal alloys, Misch metal alloys, zirconium alloys, titanium alloys, magnesium/nickel alloys, and mixtures or alloys thereof which may be AB, $AB_2$, $A_2B$, $AB_3$ or $AB_5$ type alloys. Such alloys may include modifier elements to increase their hydrogen storage capability.

Suitable aluminides compositions may include one or more of AlLi, $Al_2Li_3$, $Al_4Li_9$, $Al_3Mg_2$, $Al_{12}Mg_{17}$, $AlB_{12}$, $Al_4C_3$, $AlTi_2C$, $AlTi_3C$, $AlZrC_2$, $Al_3Zr_5C$, $Al_3Zr_2C_4$, $A_{13}Zr_2C_7$, $AlB_2$, $AlB_{12}$, and AlSi. Suitable boride compositions may include one or more of $AlB_2$, $AlB_{12}$, $B_6Ca$, $B_6K$, $B_{12}Li$, $B_6Li$, $B_4Li$, $B_3Li$, $B_2Li$, Bli, $B_6Li_7$, $BLi_3$, $MgB_2$, $MgB_4$, $MgB_7$, $NaB_6$, $NaB_{15}$, and $NaB_{16}$. Suitable carbide compositions may include one or more of $Al_4C_3$, $Na_4C_3$, $Li_4C_3$, $K_4C_3$, LiC, $LiC_6$, $Mg_2C_3$, $MgC_2$, $AlTi_2C$, $AlTi_3C$, $AlZrC_2$, $Al_3Zr_5C$, $Al_3Zr_2C_4$, $Al_3Zr_2C_7$, $KC_4$, and $NaC_4$. Suitable germanide compositions may include one or more of $Ge_4K$, GeK, $GeK_3$, $GeLi_3$, $Ge_5Li_{22}$, $Mg_2Ge$, $Ge_4Na$, GeNa, and $GeNa_3$. Suitable siliconide compositions may include one or more of AlSi, $Ca_2Si$, CaSi, $CaSi_2$, Ksi, $K_4Si_{23}$, $Li_{22}Si_5$, $Li_{13}Si_4$, $Li_7Si_3$, $Li_{12}Si_7$, $Mg_2Si$, NaSi, $NaSi_2$, and $Na_4Si_{23}$.

The anode is disposed on an imaginary line defined by the air electrode and the third electrode. That is the anode is located between the other electrodes. In one embodiment the anode may be separated from the other electrodes by a porous matrix. The porous matrix may be a zeolite, membrane or gel placed in between the anode and each of the air electrode and the third electrode. The porous matrix may be a membrane saturated with an aqueous alkaline solution, such as potassium hydroxide (KOH). Other electrolytes suitable for use in the fuel cell may include alkaline hydroxides or salt solutions. The membrane helps to physically segregate the hydrogen and oxidant to avoid direct combustion as well as provides ionic communication.

The third electrode may be a charging electrode capable of moving a locus of oxidation during charging away from the first electrode. The third electrode may be used as positive electrode, and charging of the fuel cell takes place between the anode and the third electrode. The third electrode may be similar to a positive electrode as used in a NiMH cell. The third electrode may be made of ferro-based alloys. Suitable ferro-based alloys may include stainless steel. Suitable materials may further include one or more of nickel, cadmium, palladium, lead, gold, or platinum. The third electrode may be configured as sintered type, foamed type, fiber type or the like. Such configuration may provide an increased surface area for reaction, may enhance an ability of storing electrolyte solution within the volume of its pores and may provide diffusion control. A sintered-type nickel electrode, when used as the charging electrode, is suitable in life span. On the other hand, a foamed-type nickel electrode as well as a fiber-type nickel electrode, when used as the charging electrode, is suitable for relatively high capacity.

In one embodiment, the third electrode may include nickel and nickel hydroxide. Nickel hydroxide provides high catalytic activity and large reactive area, which helps to charge the fuel cell at lower charging voltage to reduce the loss of energy. Chemical activity may be defined as the ability of a substance to accelerate a chemical reaction in presence of the substance.

Suitable amount of nickel hydroxide in third electrode may be greater than about 10 wt percent. In another embodiment, the amount may be in a range of from about 10 wt percent to about 20 wt percent, from about 20 wt percent to about 30 wt percent, from about 30 wt percent to about 40 wt percent, from about 40 wt percent to about 50 wt percent, from about 50 wt percent to about 60 wt percent, or from about 60 wt percent to about 100 wt percent.

In one embodiment, the third electrode may include a supercapacitor electrode. The supercapacitor has a large capacitance and stores a large amount of energy in a small volume. Capacitance is proportional to the surface area of the electrodes divided by their separation distance. Simple capacitors consisting of two parallel plates reach small capacitances of the order of pico-Farad ($1pF=10^{-12}F$). When such a capacitor is loaded to 1000 V, the energy content is on the order of micro-watt-second (Ws). Increasing the surface area of electrodes and minimizing the separation distance to a molecular range provides large capacitance. Capacitance of a supercapacitor is in a range of from about $10^{-6}$ farad to about $10^3$ Farad and stores energy in a range of from about $10^{-3}$ Ws to Watt-hour (Wh).

The supercapacitor electrode may be a large surface area porous electrode. The porous electrode may include a porous portion and a substrate. The substrate may be formed as a plate, a mesh, a foil, a sheet or the like. The substrate may be made of a conductive material or a non-conductive material. Suitable conductive material may include a metal such as ferro-based metal (e.g. stainless steel), titanium, platinum, iridium, or rhodium. Other suitable conductive material may be organic, such as a conductive plastic or graphite. The substrate may be non-conductive, if it is further coated with a conductive material. The conductive coating may be a one of the foregoing conductive materials.

Suitable material for the porous portion may be selected from one or more of carbon, carbon nanotubes, graphite, carbon fiber, carbon cloth, carbon aerogel, or conductive polymer. Other suitable material for porous portion may be selected from metallic powder or metal oxide.

In one embodiment, the porosity of the porous portion may be greater than about 10%. In another embodiment, the porosity of the porous portion may be in a range of from about 10% to about 20%, from about 20% to about 30%, from about 30% to about 40%, from about 40% to about 50%, or from about 50% to about 60%. In one embodiment, the pore size of the porous portion may be greater than about 1 nanometer. In one embodiment, the pore size of the porous portion may be in a range of from 1 nanometer to about 10 nanometers, from about 10 nanometers to about 20 nanometers, from about 20 nanometers to about 500 nanometers, or about 500 nanometers to about 1000 nanometers.

As noted, the third electrode may be formed from a supercapacitor electrode material. The amount of supercapacitor electrode material in the third electrode may be greater than about 10 wt percent. In one embodiment, the amount may be in a range of from about 10 wt percent to about 20 wt percent, from about 20 wt percent to about 30 wt percent, from about 30 wt percent to about 40 wt percent, from about 40wt percent to about 50 wt percent, from about 50 wt percent to about 60 wt percent, or from about 60 wt percent to about 100 wt percent.

There are several regions within the volume. A region is defined as the space that exists between the inner surface of the wall and a surface of an adjacent electrode. A first region is bounded by the inner surface of one wall and the adjacent air electrode. A second region is bounded by the inner surface of the other wall and the adjacent third electrode.

A water-controlling separator is disposed in at least one of the regions. The separator may be a membrane that is hydrophobic or superhydrophobic. A super hydrophobic surface is defined as a surface having repellency for liquid/water or a surface that does not get wet when dipped into or placed in contact of water/liquid or that has a contact angle with water drop greater than 150 degrees. The water-controlling separator prevents liquid from passing through while allowing air/oxygen to pass there through.

In one embodiment, the water-controlling separator disposed in first region at air electrode side, prevents the flooding issue when humid air flows into the air electrode. In one embodiment, the water-controlling separator disposed in the second region at third electrode side, releases the generated oxygen during charging of fuel cell into the environment.

Suitable material for water-controlling separator may include one or more of polytetrafluoroethylene, polysulphone, polyphenylene oxide, or polyetherimide. These materials may be expanded, porous, perforated, or drawn as fibers to form a mesh, weave or mat. In one embodiment, the material may be drawn as a hollow fiber. Also, the material may be surface treated to affect such properties and characteristics as hydrophobicity/hydrophilicity, anti-fouling, and water repellency.

Suitable thickness of the water-controlling separator may be greater than about 10 nanometers. In one embodiment, the thickness of the water-controlling separator may be in a range of from about 10 nanometers to about 100 nanometers, from 100 nanometers to about 1 micrometer, from about 1 micrometer to about 10 micrometers, from about 10 micrometers to about 100 micrometers, from about 100micrometer to about 1 millimeter, or greater than 1 millimeter. In one embodiment, the thickness of water-controlling separator is in a range of from about 20 micrometers to about 200 micrometers. The water-controlling separator may be characterized by one or more properties. The properties may include pore size. In one embodiment, the pore size may be in range of from about 1 nanometer to about 10 nanometers, from about 10 nanometers to about 100 nanometers, from about 100 nanometers to about 1 micrometer, from about 1 micrometer to about 10 micrometers. Naturally, the thickness, pores size, pore configuration, and any surface treatments may cooperate to control such properties as flow rate, flow selectivity, and performance.

The working of the apparatus and the function of the fuel cell are described below with reference to illustrated embodiments. Referring to the drawings, the illustrations describe embodiments of the invention and do not limit the invention thereto.

An apparatus 100 in accordance with an embodiment or the invention is shown in FIG. 1. The apparatus 100 is a fuel cell for storing energy and producing energy. The apparatus 100 includes a housing 102 having walls 104 and 106. The housing walls 104 and 106 have inner surfaces 108 and 112, and outer surfaces 110 and 114 respectively. The inner surfaces 108 and 112 define a volume 116. The housing walls 104 and 106 have apertures 118, through which oxidant can flow into, or out of, the volume 116. A first electrode 120, a second electrode 122 and a third electrode 124 are disposed in the volume 116. The second electrode 122 is separated by each of the first electrode 120 and the third electrode 124 by a membrane 126 saturated with potassium hydroxide (KOH). A first region 128 is bound by the inner surface 108 of the first wall and the first electrode. A second region 130 is bounded by the inner surface 112 of the second wall and the third electrode. A water-controlling separator 132 and 134 may be disposed in the region 128 and the region 130, respectively.

During discharge, process water is consumed and air/oxidant is supplied to the air electrode to generate hydroxyl ions. In one embodiment, before supplying a flow of air/oxidant to the air electrode from the ambient environment, carbon dioxide may be removed from the flow of air/oxidant to avoid interaction between the carbon dioxide and the alkaline electrolyte.

During use of the apparatus as a fuel cell, a voltage potential can be applied between the anode and the third electrode of the fuel cell, and the electrochemical reaction can be reversed to charge the fuel cell or metal/air battery. During charging, hydrogen is stored in the anode and oxygen is produced at the air electrode, the third electrode can spatially remove the locus for the generation of oxidation away from the second electrode/anode. Generated oxygen may be released to the atmosphere through the air electrode. The stored hydrogen can react with air/oxidant to generate electricity and water during discharge. The mechanism of a fuel cell or metal/air battery may be as follows:

In charging process:
  negative electrode: $4M+4H_2O+4e^- \rightarrow 4MH+4OH^-$
  frame third electrode: $4OH^- \rightarrow O_2+2H_2O+4e$
  total electrolysis reaction: $4M+2H_2O \rightarrow 4MH+O_2$ In discharging process:
  negative electrode: $4MH+4OH^-+4e^- \rightarrow 4M+4H_2O$
  positive electrode: $O_2+2H_2O+4e^- \rightarrow 4OH^-$
  total cell reaction: $4MH+O_2 \rightarrow 4M+2H_2O$ The air electrode may be used during the charge cycle, but may not be sufficient in some instances. For example, the air electrode may deteriorate if used to charge the fuel cell. Thus, the third electrode may be utilized as a separate oxygen generation electrode. The charge process takes place between the anode and the third electrode and the discharge process takes place between the anode and the air electrode. According to embodiments of the invention, the third electrode may be utilized to extend the cycle life over traditional structures by chemically and mechanically protecting the air electrode from degradation during recharge. Therefore, the air electrode can be free from damage during the oxygen evolution reaction.

Operation of the fuel cell at high temperature may be problematic if the temperature is high enough for water in the fuel cell to vaporize. High temperature may cause the membrane between the two electrodes to dry and lose conductivity. The fuel cell may need water in the electrolyte as well as water at the anode. Water may be generated at the air electrode. The more power a fuel cell makes, the faster the air electrode produces water and the warmer the fuel cell becomes. Because the fuel cell embodiments described herein are not necessarily closed containers, the heat generated at the air electrode may lead to evaporation of some water from the cell.

The outside temperature and humidity may influence the water management inside the fuel cell. If, under humid conditions, a fuel cell has too much water at the air electrode, oxygen cannot get to the air electrode, and the fuel cell may shut down as a result of flooding. In a dry climate, the heat from the fuel cell operation may parch the air electrode, starving it of water, and may stop the device from operating. In other words, too much water in the fuel cell may flood the air electrode, stopping the reaction and insufficient water may result losing the membrane ability to conduct OH_ across the fuel cell.

The water-controlling separator may reduce water loss and oxygen evolution during the charge process. The third electrode including nickel hydroxide or supercapacitor electrode also may reduce or prevent water loss and oxygen evolution during charge process.

The water-controlling separator disposed in the first region allows air/oxidant to flow into the air electrode and reduces or prevents flooding phenomena. At the third electrode side in the second region, the water-controlling separator allows the generated oxygen during charge process to release into the environment while reducing or preventing water/electrolyte to release through and thus reducing water loss.

During the charge reaction, when the third electrode includes nickel hydroxide or supercapacitor electrode is not fully charged, the charge reaction performs as follows:

$$Ni(OH)+OH^- \rightarrow NiOOH+H_2O+e^-$$

No oxygen releases from the third electrode and water loss may be reduced. After the third electrode is fully charged, the third electrode performs as a metal electrode of a conventional rechargeable fuel cell, releases the generated oxygen.

$$4OH^- \rightarrow 2H_2O+O_2+4e^-$$

In this way, water loss may be reduced by using nickel hydroxide or supercapacitor electrode, while the electrode is not in a fully charged state or condition. Additionally, the fuel cell has a desirable energy efficiency, as charge voltage is relatively lower.

Naturally, the discharge of the cell may be carried out using the anode and the air electrode. In one embodiment, the discharge of the cell may be carried out using the anode and the third electrode. In one embodiment, the discharge of the fuel cell may be carried out using the anode, the air electrode and the third electrode. So, current can be drawn from the air electrode, the third electrode or both. If current is to be drawn off of both the third electrode and the air electrode, the draw can be simultaneous or can be alternating between electrodes.

The discharge characteristics of the fuel cell according to one embodiment are shown in FIG. 2. FIG. 2 includes a graph 200 that shows discharge voltage and discharge current over time. Time in seconds is represented on the x-axis while discharge voltage and discharge current is represented on the y-axis. A pair of curves indicated by 202 represents the discharge voltage 204 and discharge current 206 when discharge of the fuel cell is carried out using the anode and the third electrode. Another pair of curves indicated by 208 represents the discharge voltage 210 and discharge current 212 when discharge of cell is carried out using the anode and the air electrode.

The pair of curves 202 shows higher working voltage and discharge current than as shown by the pair of curves 208. That means the cell can supply higher power density and higher energy efficiency when discharged between anode and third electrode than when discharged between the anode and the air electrode. In addition, as the $Ni(OH)_2$ or supercapacitor third electrode has the same weight as a nickel-based third electrode, and the cell maintains a high energy density.

The embodiments described herein may be examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. An apparatus, comprising;
a housing comprising at least one wall, the wall having an inner surface and an outer surface, and defining at least one aperture extending from the inner surface to the outer surface, and the inner surface further defining a volume;
at least one electrode disposed within the volume, and
a water-controlling separator disposed in the volume between the inner surface of the housing and the electrode, wherein the water-controlling separator is capable of blocking a flow of liquid from the electrode though the one or more apertures to the ambient environment while allowing oxidant to flow from the ambient environment though the one or more apertures to the electrode;
wherein the electrode is one of a plurality of electrodes, and at least a region is defined by the housing inner surface and a surface of an adjacent one of the plurality of electrodes, and further a second region is defined by an opposite inner surface of the housing and a surface of an adjacent one of the plurality of electrodes; and wherein the plurality of electrodes comprises a first electrode, a second electrode and a third electrode; and wherein the third electrode is a supercapacitor electrode.

2. The apparatus defined as claim 1, wherein the plurality of electrodes is configured as a plate.

3. The apparatus defined as claim 2, wherein the plurality of electrodes is configured as a cylinder.

4. The apparatus defined as claim 1, wherein the first electrode comprises a carbonaceous material and a catalyst wherein the catalyst is capable of accelerating dissociation of molecular oxygen.

5. The apparatus defined as claim 4, wherein the catalyst comprises metal or metal oxide.

6. The apparatus defined as claim 1, wherein the second electrode comprises hydrogen storage material.

7. The apparatus defined as claim 6, wherein the hydrogen storage material is a ceramic material.

8. The apparatus defined as claim 6, wherein the hydrogen storage material is a metal or a metal alloy.

9. The apparatus defined as claim 6, wherein the hydrogen storage material comprises one or more material selected from the group consisting of a metal hydride, an organic hydride, and a hydride slurry.

10. The apparatus defined as claim 9, wherein the hydrogen storage material comprises one or more materials selected from the group consisting of aluminides, borides, carbides, germanides, and silicides.

11. The apparatus defined as claim 1, wherein the second electrode is disposed about on an imaginary line defined by the first electrode and the third electrode.

12. The apparatus defined as claim 1, wherein the third electrode is capable of moving a locus of oxidation away from the second electrode during charging.

13. The apparatus defined as claim 1, wherein the third electrode comprises nickel hydroxide.

14. The apparatus defined as claim 13, wherein the third electrode is configured as at least one of a sintered type, foamed type, or fiber type electrode.

15. The apparatus defined as claim 1, wherein the supercapacitor electrode comprises a porous region in contact with a substrate.

16. The apparatus defined as claim 15, wherein the substrate comprises a conductive or a non-conductive material coated with a conductive coating.

17. The apparatus defined as claim 16, wherein the coating comprises one or more material selected from the group consisting of platinum, rhodium, and iridium.

18. The apparatus defined as claim 15, wherein the porous region comprises carbon or metal.

19. The apparatus defined as claim 18, wherein the porous region is carbon and is in a form selected from the group consisting of carbon nanotubes, graphite flakes or powders, carbon fiber, carbon cloth, and carbon aerogel.

20. The apparatus defined as claim 18, wherein the porous region is metal and is in form of metal powder or metal flakes.

21. The apparatus defined as claim 1, wherein the water-controlling separator is a hydrophobic membrane capable of passing air therethrough.

22. The apparatus defined as claim 21, wherein the hydrophobic membrane is disposed within at least one of the first region or the second region.

23. The apparatus defined as claim 21, wherein the hydrophobic membrane comprises at least one of polytetrafluoroethylene, polysulphone, polyphenylene oxide, or polyetherimide.

24. The apparatus defined as claim 21, wherein a thickness of the hydrophobic membrane is in a range of from about 10 nanometers to about 1 millimeter.

25. The apparatus defined as claim 21, wherein the hydrophobic membrane is porous.

26. The apparatus defined as claim 25, wherein the pores have an average diameter that is in a range of from about 1 nanometer to about 10 micrometers.

27. An apparatus, comprising:
a housing comprising at least one wall, the wall having an inner surface and an outer surface and defining at least one aperture extending from the wall inner surface to the wall outer surface, and the wall inner surface further defining a volume;
at least one electrode disposed within the volume, wherein the electrode is a supercapacitor electrode; and
a water-controlling separator disposed in a region in the volume between the wall inner surface and the at least one electrode, wherein the water-controlling separator blocks a flow of liquid from the electrode though the one or more apertures to the ambient environment while allowing oxidant to flow from the ambient environment though the one or more apertures to the electrode.

28. A method, comprising: drawing a discharge current or a working voltage in a fuel cell from an anode and an air electrode and from the anode and a third electrode, wherein at least on electrode is a supercapacitor electrode.

29. The method defined as claim 28, the discharge current is drawn simultaneously both from the anode and the air electrode, and from the anode and the third electrode.

30. The method defined as claim 28, the discharge current is drawn alternating between the anode and the air electrode, and the anode and the third electrode.

31. The method defined as claim 28, further comprising storing and releasing hydrogen from the anode.

32. The method defined as claim 28, further comprising adsorbing carbon dioxide from a flow of ambient air before supplying the air flow to the air electrode.

* * * * *

UNITED STATES PATENT AND TRADEMARK OFFICE
CERTIFICATE OF CORRECTION

PATENT NO. : 7,638,216 B2  Page 1 of 1
APPLICATION NO. : 11/566347
DATED : December 29, 2009
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Ninth Day of November, 2010

David J. Kappos
*Director of the United States Patent and Trademark Office*